Inventors:
Leslie L. Baird,
Ralph J. Baskerville
by Irving H. Marshman
Their Attorney.

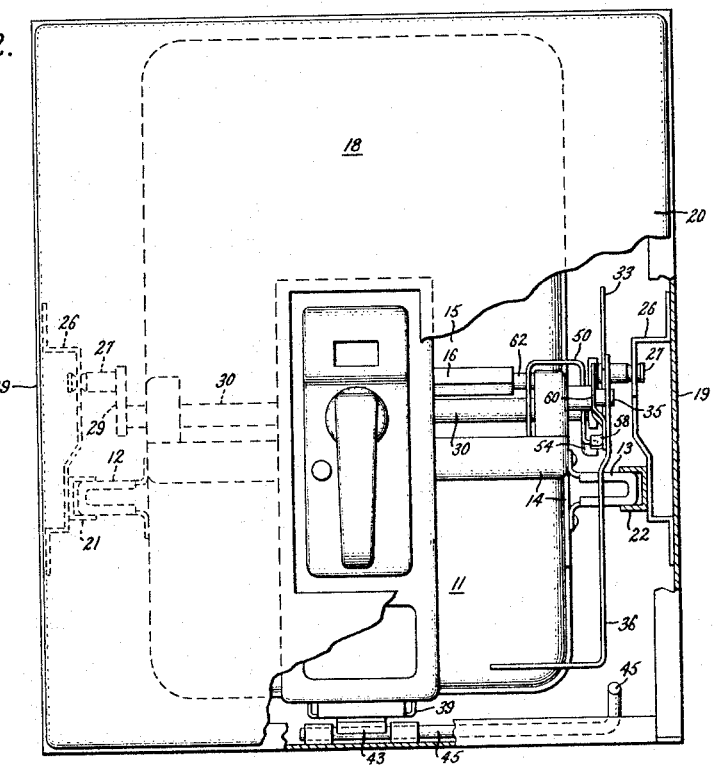

United States Patent Office 3,005,064
Patented Oct. 17, 1961

3,005,064
DRAWOUT MECHANISM FOR METAL-ENCLOSED ELECTRIC SWITCHGEAR
Leslie L. Baird, Swarthmore, and Ralph J. Baskerville, Drexel Hill, Pa., assignors to General Electric Company, a corporation of New York
Filed Feb. 5, 1959, Ser. No. 791,459
12 Claims. (Cl. 200—50)

This invention relates to improvements in drawout mechanisms for metal-enclosed electric switchgear, and more particularly it relates to an improved interlock arrangement for ensuring safe and correct operation of such a mechanism.

Electric circuit breakers are commonly housed in grounded metal enclosures to provide maximum safety for operators and equipment. Normally such circuit breakers are removable from their enclosures to provide maximum accessibility for maintenance with minimum interruption of service. The removable circuit breaker unit is typically provided with a set of disconnect contacts cooperably engageable with stationary disconnect contacts located in the enclosure unit or cubicle for connecting the circuit interrupting switch contacts of the breaker to electric supply and load circuits. A drawout mechanism including racking means is provided for guiding and driving the removable circuit breaker unit to and from its connected position within the enclosing cubicle.

The above-mentioned cooperating disconnect contacts are not designed for circuit making or breaking duty, and therefore it is important that the switch contacts of the breaker be open, thereby breaking the electric circuit, before the removable unit is inserted or withdrawn. In order to obtain this desired operational sequence, drawout mechanisms are conventionally supplied with automatic interlocking means. Accordingly, it is a general object of this invention to provide an improved drawout mechanism having relatively simple and inexpensive interlock means for preventing the effective insertion or withdrawal of the removable unit with respect to the enclosure unit unless the circuit breaker has been positively opened and for preventing closing of the circuit breaker throughout the travel of the removable unit to and from its connected position within the enclosure unit.

In carrying out our invention in one form, a drawout type circuit breaker unit movable into and out of a relatively stationary enclosure unit is provided with racking means for imparting to the circuit breaker unit reciprocating movement to and from a fully inserted position within the enclosure unit. The racking means includes a pair of releasably engageable camming components mounted on the circuit breaker and enclosure units, respectively, and an actuating member for one of the camming components. The actuating member is disposed for movement between initial and final positions for effecting movement of the one component with respect to the other component in a manner to drive the circuit breaker unit to and from its fully inserted position. We provide a movable interlock member which is self-biased to a first position for holding a trip shaft of the circuit breaker in a trip-free disposition thereby preventing closing of the circuit breaker.

The interlock member is arranged to cooperate with the actuating member of the racking means in the following three respects: it is positively maintained in its first position while reciprocating movement of the circuit breaker unit is being effected; it is moved against its bias to a second position, thereby releasing the trip shaft and permitting breaker closing, in response to movement of the actuating member to its final position which completes the insertion or withdrawal operation; and when blocked in its second position it positively prevents effective movement of the actuating member toward its initial position. The interlock member is positively blocked in its second position by a switch member of the circuit breaker whenever the circuit breaker is closed, and therefore the racking means cannot effect appreciable movement of the circuit breaker unit with respect to the enclosure unit until the circuit breaker has been opened.

Our invention will be better understood and its various objects and advantages will be more fully appreciated from the following description taken in conjunction with the accompanying drawings in which:

FIG. 1 is a side elevation of a removable circuit breaker unit in a stationary enclosure unit with the near side of the enclosure partially removed in order more clearly to show details of the structure and arrangement of the preferred form of our invention;

FIG. 2 is a front elevation of the enclosed circuit breaker unit with the enclosure door partially removed for a clearer showing of the racking means as it is disposed with the circuit breaker unit in its fully inserted position and FIG. 3 is an exploded perspective view of the racking means shown in FIG. 2.

Figure 3:
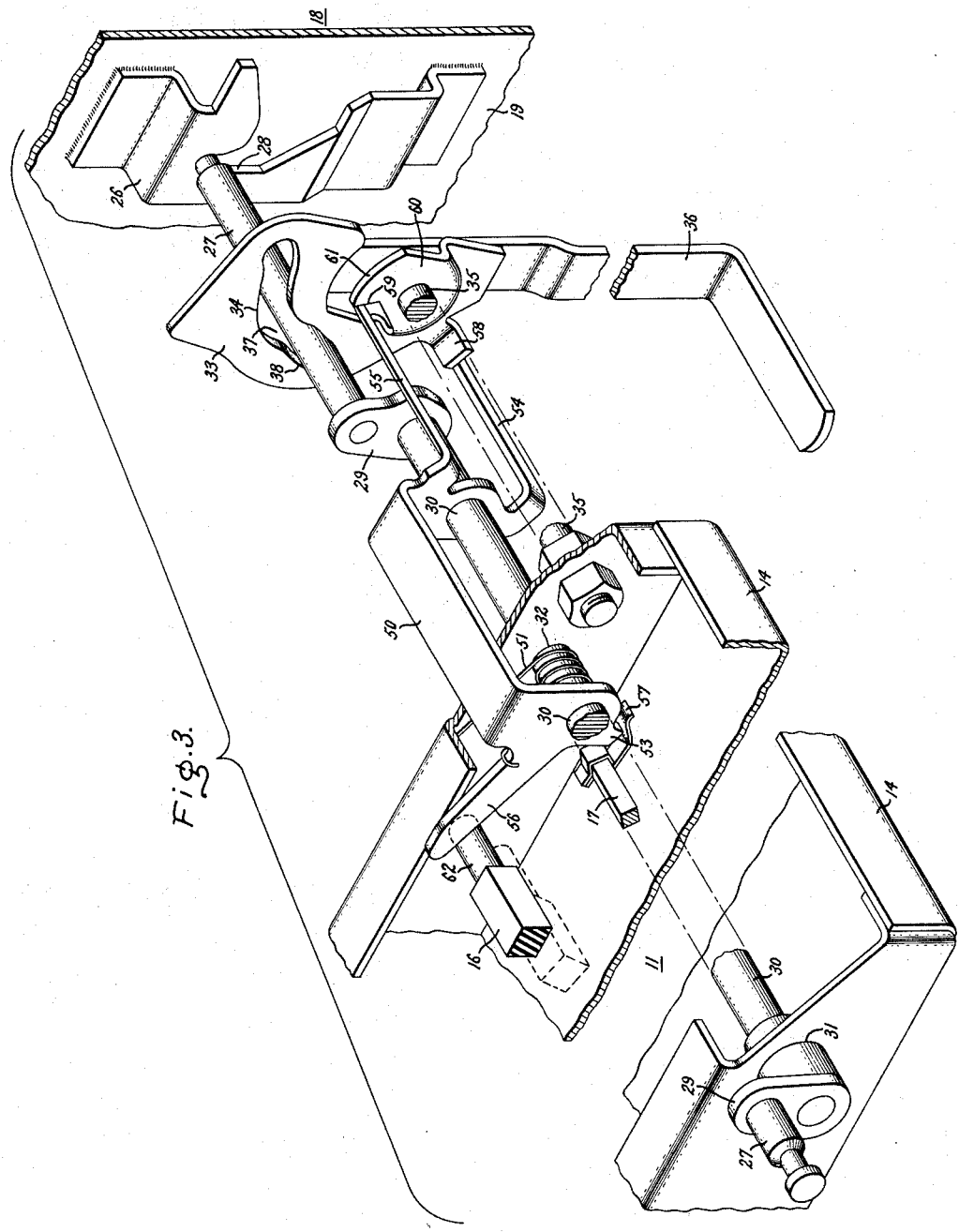

Referring now to FIGS. 1 and 2, a movable circuit breaker unit indicated generally by the reference number 11, is shown including on opposite sides a pair of laterally raised channel-like guide and supporting members 12 and 13. The guide and supporting members 12 and 13 are affixed to a frame structure 14 upon which is mounted an electric circuit breaker 15. The circuit breaker 15 may be of any type having a movable switch member 16 and a rotatable trip member or shaft 17 (FIG. 3). The switch member 16 is connected by means not shown to the circuit interrupting switch contacts of the breaker (not shown), and circuit opening and closing operations of the breaker are accompanied by movement of the switch member 16 between the solid and broken-line positions shown in FIG. 3. With the circuit breaker in a closed circuit condition, the switch member 16 is in its solid-line position. The trip shaft 17 is connected by means not shown to the tripping mechanism of the breaker (not shown), and it will be understood that clockwise tilting of the shaft 17, as viewed in FIG. 3, not only effects opening of the circuit breaker 15 but also will result in trip-free operation of the breaker upon any subsequently attempted breaker closing.

The removable circuit breaker unit 11 is disposed for reciprocating movement in a generally horizontal direction to and from a fully inserted position within a metallic enclosure unit or cubicle 18 having sidewalls 19 and a vertically hinged door 20, shown open in FIG. 1. Respectively secured to the sidewalls 19 are two horizontally extending supporting channels or rails 21 and 22 which are disposed slidably to receive the channel-like members 12 and 13 of the removable circuit breaker unit 11. Stationary disconnect contacts 23 are provided in the backwall of the enclosing cubicle 18 suitable for engagement by cooperating movable disconnect contacts 24 projecting rearwardly from a base member 25 which is part of the circuit breaker unit 11. The movable disconnects 24 are connected by means not shown to the switch contacts of the circuit breaker 15. When in engagement, the stationary and movable disconnects 23 and 24 provide a path for current flow, and in order to keep the resistance of this current path low, the movable disconnects 24 are spring loaded. Thus, a considerable force is required to drive the removable circuit breaker unit 11 to its fully inserted position in which the cooperating disconnects are engaged.

The required force is obtained by racking means which imparts reciprocating movement to the circuit breaker unit 11 with respect to the enclosure unit 18. The racking means includes two sets of releasably engageable camming components 26 and 27 respectively mounted on the enclosure unit and the circuit breaker unit. As can be seen in FIG. 2, a camming component 26 is secured on the inner face of each sidewall 19 of the enclosure unit 18, and as is best seen in FIG. 3, each component 26 preferably comprises a bracket having an open-end transverse camming slot 28 located therein. The open end of the slot 28 faces the front of the enclosure unit, and the slot runs upwardly in the bracket with its lengthwise dimension being generally vertical. A frontwardly protruding lip of the bracket 26 overhangs the open end of the slot 28.

The slot 28 in each camming component 26 is adapted to receive the cooperating camming component 27 which preferably comprises a laterally protruding pin mounted for pivotal movement about an eccentric axis. As is clearly seen in FIG. 3, each pin 27 protrudes axially from a crank 29 of a rigid crankshaft 30 which extends across the full width of the circuit breaker unit 11. The crankshaft 30 is suitably journaled at 31 and 32 to portions of the frame structure 14 of the removable circuit breaker unit. By rotating the crankshaft 30 with the heads of the pins 27 respectively disposed in slots 28 of the brackets 26, the removable unit 11 is driven to or from its fully inserted position within the enclosure unit 18.

In order to rotate the crankshaft 30 and hence move the camming components 27, an actuating member 33 is provided. The actuating member 33 preferably is a plate-like member having a generally involute-shaped camming slot 34 therein. This member is rotatably supported by the frame structure 14 of the removable circuit breaker unit 11, and as best seen in FIG. 3, its rotatable support is provided by a shaft 35 affixed to the frame structure 14 adjacent the crankshaft 30. Thus the actuating member 33 pivots about a different center of rotation than the camming components or pins 27. One of the pins 27 is received in the involute camming slot 34. An elongated manually operable lever 36 is affixed to the actuating member 33 for moving this member between an initial position shown in FIG. 1, and a final position shown in FIGS. 2 and 3.

The involute slot 34 of the actuating member 33 is shaped so that as this member is moved from its initial position (FIG. 1) toward its final position by a downward stroke of the lever 36, the camming component or pin 27, which must remain in the slot 34, moves upwardly with respect to the relatively stationary camming component or bracket 26 and the crankshaft 30 is consequently rotated. With the pins 27 disposed in the slots 28 of the respective brackets 26, this rotation of the crankshaft and relative movement of the pins 27 causes a camming action to take place between the interchanging pins and brackets, thereby pulling or driving the circuit breaker unit 11 into the enclosure unit 18 to its fully inserted position.

The circuit breaker unit 11 first reaches its fully inserted position when the actuating member 33 has been moved to a predetermined position intermediate its initial and final positions. In this intermediate position of the actuating member, the pin 27 is disposed at point 37 in the involute slot 34. Further movement of the actuating member to its final position will not move the camming components or pins 27, since the remaining portion 38 of the slot 34 is made concentric with respect to the axis of shaft 35. In other words, movement of the actuating member 33 between its intermediate and final positions is ineffective to cause relative movement of the camming components 26 and 27. With the operating lever 36 of the actuating member 33 in its lowest position (FIGS. 2 and 3), the pins 27 are captured in slots 28 of the brackets 26, and the removable circuit breaker unit 11 is firmly locked in its fully inserted position against the magnetic forces set up by current flowing through the engaged disconnect contacts 23 and 24.

In order to withdraw the removable unit 11 from the enclosure 18, the operating lever 36 must be raised thereby moving the actuating member 33 from its final to its initial position. The actuating member 33 can move freely from its final to its intermediate position since the camming component 27 is in the concentric portion 38 of the slot 34. In the intermediate position of the actuating member 33, the camming component 27 is at point 37 in the involute slot 34, and further movement of the actuating member toward its initial position forces the crankshaft 30 to rotate and the camming components 27 to move downwardly in slots 28 of the cooperating camming components 26. This in effect pushes the removable unit 11 away from its fully inserted position and causes the cooperating disconnect contacts 23 and 24 to become disconnected. With the actuating member 33 in its initial position, the camming components 27 are free to move out of the open ends of the slots 28 in the camming components 26.

After the circuit breaker unit 11 has been disconnected from the electric power supply and load by the racking means in the manner described above, it may be moved to a test position (in which it is shown in FIG. 1) or it may be completely removed from the enclosure unit 18. It is desirable to have automatically effective stop means for defining the test position and for stopping the unit 11 just before its guide and supporting members 12 and 13 leave their respective supporting rails 21 and 22. Toward this end we provide at the bottom of the removable unit 11 an elongated channel-shaped member 39 in which two spaced apart slots or recesses 40 and 41 are punched. See FIGS. 1 and 2. The member 39 rides over a tongue 42 of a catch 43 which is biased by a spring 44 or the like to a raised position. The catch 43 is pivotally mounted at the bottom of the enclosure unit 18, and it can be manually depressed against its bias by means of a handle 45 which extends to the side of the enclosure unit, as shown in FIG. 2, for convenient access.

When the removable circuit breaker unit 11 reaches its test position during a withdrawal operation, slot 40 in member 39 becomes aligned with the tongue 42 of the catch 43, and the tongue 42 enters this slot to hold the circuit breaker unit 11 firmly in its test position. In order to move the unit 11 further, the handle 45 must be raised manually thereby withdrawing the tongue 42 of the catch from slot 40 and releasing the circuit breaker unit. A similar stopping or retaining action takes place when slot 41 of member 32 moves into alignment with the tongue 42. This latter action takes place before the cooperating supporting members 12 and 21 and 13 and 22 become separated.

It has been pointed out hereinbefore that operation of the racking means to effect engagement and disengagement of the cooperating disconnect contacts 23 and 24 during insertion and withdrawal of the circuit breaker unit 11 should not be permitted to take place unless the circuit breaker 15 is in an open circuit condition. This desired function is accomplished by an interlock member 50 associated with the racking means and disposed in cooperation with the circuit breaker switch member 16 and trip shaft 17. The interlock member 50, as is most clearly seen in FIG. 3, is supported on the crankshaft 30 for pivotal movement between two different positions. A torsion spring 51 is provided to bias the interlock member 50 to a first one of its two positions in which it is shown in FIG. 1.

As can be seen in FIG. 3, the interlock member 50 comprises four different integrally associated elements 53, 54, 55 and 56. Element 53 is disposed in cooperation with a paddle 57 affixed to the circuit breaker trip shaft 17. Movement of the interlock member 50 to its first position in accordance with its bias causes element 53 to engage the paddle 57 and thereby tilt the trip shaft 17 in a manner to unlatch the circuit breaker operating mechanism (not shown). As long as the interlock member 50 is in its first position, the element 53 is effective to hold the trip shaft 17 in a trip-free disposition, whereby the circuit breaker 15 cannot be closed. Element 53 will release the trip shaft 17 and closing of the circuit breaker will be permitted only when the interlock member is moved to its second position.

The interlock member 50 is arranged for movement against its bias to its second position in response to movement to the actuating member 33 from its intermediate to its final position. This is accomplished by the element 54 of member 50 which is disposed in cooperation with an element or lug 58 associated with the actuating member 33. The element 58 is disposed so that one of its edges slidably engages the flat surface of element 54 as the actuating member 33 is approaching its final position, and as a result the interlock member 50 is driven to its second position. It is important to note that this action takes place afer the movable circuit breaker unit 11 has attained its fully inserted position.

The cooperating interengaging elements 54 and 58 are so constructed and arranged that the edge of element 58 slides off of the flat surface of element 54 just as the actuating member 33 reaches its final position. Bias spring 51 tends to rotate the interlock element 50 back toward its first position, but the narrow surface or edge of element 54 will now abuttingly engage the flat surface of element 58 and the interlock member 50 is thereby held in its second position. See FIG. 3.

The abutting engagement between elements 54 and 58, with the actuating member 33 disposed in its final position, is also effective to resist movement of the actuating member toward its initial position. In other words, the force of the bias spring 51 is transmitted to the actuating member 33 by the interengaging elements 54 and 58 in a direction opposing the rotation of the actuating member 33 from its final toward its initial positions. This is desirable from the point of view of preventing accidental operation of the racking means with the circuit breaker fully inserted.

When the interlock member 50 is moved to its second position in the manner indicated above, its element 55 moves behind a shoulder 59 formed on the hub portion 60 of the actuating member 33. As can be seen most clearly in FIG. 3, whenever the interlock member is in this position the element 55 is disposed positively to prevent or block pivotal movement by the actuating member 33 to its initial position. Actually the actuating member can be moved to some extent toward its intermediate position before the shoulder 59 will engage the blocking element 55, but this particular movement by the actuating member is ineffective to move the camming components 27. Consequently the circuit breaker unit 11 cannot be moved appreciably from its fully inserted position as long as the interlock member 50 is in its second position.

During an attempted circuit breaker unit withdrawal operation of the racking means, the lever 36 of the actuating member 33 is moved from the position in which it is shown in FIG. 3 toward its raised position (FIG. 1). The blocking element 55 of the interlock member 50 is disposed to permit sufficient movement of the actuating member 33 for element 58 thereof to release the cooperating element 54 of member 50. At this point the actuating member 33 has not yet reached its intermediate position, and no movement of the camming components 27 has been produced. As of the moment that the cooperating elements 54 and 58 become disengaged, the interlock member 50 is able to rotate to its first position under the influence of its bias spring, unless such movement is blocked by other means.

Assuming that the interlock member 50 has moved to its first position, the blocking element 55 thereof will now be disposed in a non-interfering relationship with respect to the shoulder 59 of the actuating member 33, and the actuating member 33 can be moved to its initial position in order to drive the circuit breaker unit 11 out of its fully inserted position. During this effective movement of the actuating member 33, that is, while the actuating member is moving between its intermediate and initial positions, the crown 61 of the hub portion 60 of this member is disposed under the blocking element 55 of the interlock member 50 thereby positively maintaining the interlock member in its first position. This prevents accidental or deliberate movement of the interlock member 50 out of its first position during a racking operation and for as long as the actuating member 33 is in its initial position with the lever 36 raised.

As pointed out in the preceding three paragraphs, effective movement of the actuating member 33 from its final toward its initial position is positively prevented by the blocking element 55 of the interlock member 50 as long as the interlock member is in its second position. Although the interlock member 50 is released for return to its first position by the disengagement of elements 54 and 58 during an early stage of actuating member movement, the interlock member may nevertheless be prevented from moving out of its second position by other means which will now be described.

As is most clearly shown in FIG. 3, the element 56 of the interlock member 50 is disposed in cooperation with the switch member 16 of the circuit breaker 15. Whenever the circuit breaker is closed, an extension 62 of the switch member 16 is disposed in the path which element 56 must follow in order to permit the interlock member 50 to move from its second to its first positions. Thus the interlock member 50 is positively maintained in its second position whenever the circuit breaker is in a closed circuit condition. Upon opening the circuit breaker, the switch member 16 and its extension 62 move to the broken-line position shown in FIG. 3 thereby unblocking element 56 and permitting the interlock member 50 to move to its first position in accordance with its bias. The first position of the interlock member is determined by the abutting engagement of the element 56 with extension 62 of the switch member 16 (the circuit breaker now being in an open circuit condition), as is shown in FIG. 1.

This positive interlock feature of our invention ensures that a racking operation cannot be started unless the circuit breaker 15 contained by the removable circuit breaker unit 11 is open. Although the element 56 of the interlock member faithfully senses the open or closed condition of the circuit breaker, it is not normally engaged by the switch member 16 and therefore is not subject to repeated wear everytime the breaker is closed.

From the foregoing detailed description of the structure of the drawout mechanism, its mode of operation may be be readily followed. The removable circuit breaker unit 11 cannot be moved to its fully inserted position within the enclosure unit 18 unless the actuating member 33 is first moved to its initial position by rasing the operating lever 36 to the position shown in FIG. 1. This lowers the camming components or pins 27 to the proper level for entering the open ends of the slots 28 in the cooperating camming components or brackets 26. Whenever the actuating member 33 is in any other position, the pins 27 are so located that they will strike the frontwardly protruding lips of brackets 26 thereby stopping any attempted insert operation before the movable disconnect contacts 24 engage the respective stationary disconnect contacts 23.

Before the actuating member 33 can be moved to its initial position, the circuit breaker 15 must first be opened. This moves the switch member 16 to its broken-line position shown in FIG. 3 where its extension 62 is disposed out of blocking relationship with respect to the element 56 of the interlock member 50. The interlock member 50 is now free to rotate under the influence of its bias to its first position as soon as its element 54 is released by the cooperating element 58 of the actuating member 33 during early movement of the actuating member from its final position toward its intermediate position. With the interlock member 50 in its first position, element 55 is disposed out of blocking relationship with respect to the shoulder 59 of the actuating member 33, and the actuating member can be moved all the way to its initial position. Element 53 of the interlock member, when in its first position, engages paddle 57 thereby holding the trip shaft 17 of the circuit breaker 15 in a trip-free disposition.

The removable circuit breaker unit 11 is manually pushed into the enclosure unit 18 until the camming components or pins 27 engage the rear edges of the respective camming components or brackets 26 defining the slots 28. The lever 36 is lowered to move the actuating member from its initial toward its final position thereby rotating the crankshaft 30 and raising the pins 27 in slots 28. In this manner the removable circuit breaker unit 11 is driven to its fully inserted position wherein the cooperating disconnect contacts 23 and 24 are fully engaged. This fully inserted position is attained when the actuating member 33 has reached its intermediate position, and further movement of the actuating member effects no relative movement of the circuit breaker unit 11.

While moving from its initial to its intermediate positions, the actuating member 33 has been positively maintaining the interlock member 50 in its first position. This is accomplished by the crown 61 of the actuating member which rides under the element 55 of the interlock member 50 thereby blocking any attempted rotation of the interlock member toward its second position. Consequently, the circuit breaker 15 is maintained in its open circuit condition throughout the insert operation.

As the actuating member 33 is moved from its intermediate position to its final position (FIG. 3), its element 58 slidably engages element 54 of the interlock member 50 and moves the interlock member against its bias to its second position. As the actuating member 33 reaches its final position, element 58 slides over element 54 and these cooperating elements become disposed in abutting engagement shown in FIG. 3. This holds the interlock member 50 in its second position and also resists movement of the actuating member 33 toward its initial position. Element 53 of the interlock member 50 has now moved out of engagement with the paddle 57 and no longer holds the trip shaft 17 in a trip-free disposition. Consequently the circuit breaker 15 can now be closed.

In order to withdraw the removable circuit breaker unit 11 from its fully inserted position, the above-described insert operation is essentially reversed. In moving the actuating member 33 from its final to its intermediate position, element 58 thereof releases element 54 of the interlock member 50. In order to permit movement of the actuating member 33 from its intermediate to its initial position, the interlock member 50 must now move to its first position wherein its element 55 will be out of the path of movement of shoulder 59 of the actuating member. But the interlock member 50 cannot move to its first position unless the circuit breaker 15 is first opened so that the switch member 16 will move out of blocking relationship with respect to element 56. With the circuit breaker open, movement of the actuating member 33 to its initial position can continue, thereby effecting relative movement of the camming components 26 and 27 to rack the removable circuit breaker unit 11 out of its fully inserted position within the enclosure unit 18.

While we have shown and described a preferred form of our invention by way of illustration, many modifications will occur to those skilled in the art. We therefore contemplate by the claims which conclude this specification to cover all such modifications as fall within the true spirit and scope of our invention.

What we claim as new and desire to secure by Letters Patent of the United States is:

1. In a drawout mechanism for an electric circuit breaker having a movable switch member and a movable trip shaft: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final positions and being effective while moving toward said final position to move said one component with respect to the other component in a manner to drive the circuit breaker unit to its fully inserted position; and a movable interlock member associated with said racking means and adapted to cooperate with the circuit breaker switch member and trip shaft, said interlock member being biased to a first position for holding the trip shaft in a trip-free disposition, thereby preventing closing of the circuit breaker, and being disposed for movement against its bias to a second position upon movement of said actuating member to said final position, thereby to release the trip shaft and permit breaker closing, said interlock member in its second position being arranged to prevent effective movement of the actuating member toward said initial position, whereby the circuit breaker unit cannot be moved appreciably from its fully inserted position as long as said interlock member is in its second position, said interlock member being positively prevented from returning from its second to its first position by the circuit breaker switch member whenever the circuit breaker is closed.

2. A drawout mechanism for an electric circuit breaker having movable switch and trip members comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final positions and being effective during movement toward said final position to move said one component with respect to the other component in a manner to drive the circuit breaker unit to its fully inserted position; and a movable interlock member associated with said racking means and adapted to cooperate with the circuit breaker switch and trip members, said interlock member when disposed in a predetermined first position being effective to hold the trip member in a trip-free disposition, thereby maintaining the circuit breaker in an open circuit condition, and being operable from its first position to a predetermined second position in response to movement of said actuating member to said final position, thereby to release the trip member and permit breaker closing, said interlock member when disposed in its second position being effective to prevent movement of the actuating member to said initial position, whereby the circuit breaker unit cannot be moved appreciably from its fully inserted position as long as said interlock member is in its second position, said interlock member being positively blocked in its second position by the circuit breaker switch member whenever the circuit breaker is in a closed circuit condition.

3. A drawout mechanism for an electric circuit breaker having a movable switch member and a movable trip shaft comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final positions and being effective while moving toward said final position to move said one component relative to the other component in a manner to drive the circuit breaker unit to its fully inserted position; and an interlock member supported for movement between two different positions in cooperation with said actuating member and the circuit breaker switch member and trip shaft, said actuating member, when in said initial position and while effecting movement of the circuit breaker unit toward its fully inserted position, being arranged positively to maintain said interlock member in one of its two positions in which the interlock member holds the circuit breaker trip shaft in a trip-free disposition, thereby preventing closing of the circuit breaker, said interlock member being arranged for movement to the other of its two positions, thereby releasing the trip shaft and permitting breaker closing, in response to the movement of said actuating member to said final position and being positively maintained in its other position by the circuit breaker switch member whenever the circuit breaker is closed, said interlock member when in its other position being disposed to prevent movement of said actuating member to said initial position, whereby the circuit breaker unit cannot be moved appreciably from its fully inserted position until the circuit breaker has been opened.

4. A drawout mechanism for an electric circuit breaker having a movable switch member and a movable trip shaft comprising: an enclosure unit; a removable circuit breaker unit adapted to contain the circuit breaker and disposed for reciprocating movement to and from a fully inserted position within the enclosure unit; racking means for imparting said reciprocating, movement to the circuit breaker unit including a pair of releasably engageable camming components mounted on the circuit breaker and enclosure units respectively, and an actuating member for one of said camming components, said actuating member being disposed for movement between predetermined initial and final positions and being effective while moving toward said final position to move said one component with respect to other component in a manner to drive the circuit breaker unit to its fully inserted position; a movable interlock member associated with said racking means and adapted to cooperate with the circuit breaker switch member and trip shaft, said interlock member having four different elements integrally associated therewith; and means biasing said interlock member to a predetermined first position in which a first one of said elements holds the circuit breaker trip shaft in a trip-free disposition, thereby maintaining the circuit breaker in an open circuit condition; a second one of said elements being responsive to movement of the actuating member to said final position to move the interlock member against its bias to a predetermined second position in which said first element no longer holds the trip shaft and a third one of said elements is disposed to block effective movement of the actuating member toward said initial position, whereby the circuit breaker unit cannot be moved appreciably from its fully inserted position as long as the interlock member is in its second position, and a fourth one of said elements disposed in cooperation with the circuit breaker switch member to block movement of the interlock member from its second to its first position whenever the circuit breaker is in a closed circuit condition.

5. A drawout mechanism for an electric circuit breaker having a movable switch member comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final position and being effective during movement toward said final position to move said one component with respect to other component in a manner to drive the circuit breaker unit to its fully inserted position; and an interlock member supported for movement between two different positions in cooperation with said actuating member and the circuit breaker switch member, said interlock member being driven from one to the other of its two positions by the actuating member upon movement of said actuating member to its final position and being positively prevented from returning to its one position by the switch member whenever the circuit breaker is closed, said interlock member being disposed when in its other position to prevent effective movement of the actuating member toward said initial position, whereby the circuit breaker unit cannot be moved appreciably from its fully inserted position as long as the circuit breaker is closed.

6. A drawout mechanism for an electric circuit breaker having a movable switch member comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final positions and being effective during movement toward said final position to move said one component with respect to the other component in a manner to drive the circuit breaker unit to its fully inserted position; and an interlock member movable between two different positions in cooperation with said actuating member and the circuit breaker switch member, siad interlock member being biased to one of its two positions and being disposed for movement against its bias to the other of said two positions in response to movement of said actuating member to said final position, said interlock member being held in its other position by said actuating member when in said final position and being prevented from returning to its one position by the circuit breaker switch member whenever the circuit breaker is closed, said actuating member being prevented from moving to said initial position by the interlock member when in its other position, whereby the circuit breaker unit cannot be moved appreciably from its fully inserted position as long as the circuit breaker is closed.

7. A drawout mechanism for an electric circuit breaker having a movable switch member comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member disposed for movement between predetermined initial and final positions, said actuating member being effective while moving toward said final position to move one of said camming components with respect to the other in a manner to drive the circuit breaker unit to its fully inserted position; an interlock member supported for movement between first and second predetermined positions in cooperation with said actuating member and the circuit breaker switch member; means biasing said interlock member to its first position; a first element integrally associated with said interlock member; a cooperating element associated with said actuating member and disposed slidably to engage one surface of said first element for moving the interlock member against its bias to its second position in response to movement of the actuating member to said final position, the interengaging elements being constructed and arranged so that with the actuating member in said final position the cooperating element and a different surface of the first element are disposed in abutting engagement effective to hold the interlock member in its second position and to resist movement of the actuating member toward said initial position; and another element integrally associated with said interlock member and disposed positively to prevent movement of the actuating member to said initial position as long as the interlock member is in its second position, said interlock member being prevented from returning to its first position by the circuit breaker switch member whenever the circuit breaker is closed, whereby the circuit breaker unit cannot be moved appreciably from its fully inserted position unless the circuit breaker is opened.

8. A drawout mechanism for an electric circuit breaker having a movable switch member comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member disposed for movement between predetermined initial and final positions, said actuating member being effective while moving from said initial position to a position intermediate said initial and final positions to move one of said camming components with respect to the other component in a manner to drive the circuit breaker unit to its fully inserted position and being ineffected to cause relative movement of said components while moving between said intermediate and final positions; an interlock member supported for movement between first and second predetermined positions in cooperation with said actuating member and the circuit breaker switch member; means biasing said interlock member to its first position; a first element integrally associated with said interlock member; a cooperating element associated with said actuating member and disposed slidably to engage one surface of said first element for moving the interlock member against its bias to its second position in response to movement of the actuating member from said intermediate position toward said final position, the interengaging elements being constructed and arranged so that with the actuating member in said final position the cooperating element is disposed in abutting engagement with a different surface of the first element to hold the interlock member in its second position and the first element, in conjunction with said biasing means, is disposed to resist movement of the actuating member toward said intermediate position; and another element integrally associated with said interlock member and disposed to prevent effective movement of the actuating member from said intermediate position toward its initial position as long as the interlock member is in its second position, said interlock member being blocked in its second position by the circuit breaker switch member whenever the circuit breaker is closed, whereby the circuit breaker unit cannot be moved from its fully inserted position unless the circuit breaker is opened.

9. A drawout mechanism for an electric circuit breaker having a movable switch member and a movable trip shaft comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member disposed for movement between predetermined initial and final positions, said actuating member being effective while moving from said initial position to a position intermediate said initial and final positions to move one of said camming components relative to the other in a manner to drive the circuit breaker unit to its fully inserted position and being ineffective to cause relative movement of said components while moving between said intermediate and final positions; and an interlock member supported for movement between first and second predetermined positions in cooperation with said actuating member and the circuit breaker switch member and trip shaft, said interlock member being positively maintained in its first position by said actuating member during movement thereof between said initial and intermediate positions and being effective when in its first position to hold the circuit breaker trip shaft in a trip-free disposition thereby preventing closing of the circuit breaker, said interlock member being arranged for movement to its second position, thereby releasing the trip shaft and permitting breaker closing, in response to movement of the actuating member from said intermediate position to said final position and being positively maintained in its second position by the circuit breaker switch member whenever the circuit breaker is closed, said interlock member when in its second position being disposed to prevent effective movement of the actuating member from said intermediate position toward said initial position, whereby the circuit breaker unit cannot be withdrawn from its fully inserted position as long as the circuit breaker is closed.

10. A drawout mechanism for an electric circuit breaker having a movable trip shaft comprising: an enclosure unit; a removable circuit breaker unit adapted to contain the circuit breaker and disposed for reciprocating movement to and from a fully inserted position within the enclosure unit; racking means for imparting said reciprocating movement to the circuit breaker unit including a pair of releasably engageable camming components mounted on the circuit breaker and enclosure units, respectively, and an actuating member for one of said camming components, said actuating member being disposed for movement between predetermined initial and final positions and being effective while moving toward said final position to move said one component relative to the other component in a manner to drive the circuit breaker unit to its fully inserted position; and an interlock member supported for movement between two different positions in cooperation with said actuating member and the circuit breaker trip shaft, said interlock member being self-biased to a predetermined one of its two positions in which it holds the circuit breaker trip shaft in a trip-free disposition, thereby preventing closing of the circuit breaker, and being positively prevented from moving to the other of its two positions by the actuating member whenever the actuating member is in said initial position and while the actuating member is effecting movement of the circuit breaker unit to its fully inserted position, said interlock member being disposed for movement to said other position, thereby releasing the trip shaft and permitting breaker closing, in response to movement by said actuating member to said final position.

11. In a drawout mechanism for an electric circuit breaker: an enclosure unit; a removable circuit breaker unit adapted to contain the circuit breaker and disposed for reciprocating movement to and from a fully inserted position within the enclosure unit; racking means for the circuit breaker unit including a rotatable actuating member pivotally mounted at its center of rotation on one of said units and having a generally involute camming slot therein, said involute slot being concentric about said center of rotation at one end thereof, a pin mounted for pivotal movement about an eccentric axis on said one unit and disposed in said involute slot, and a bracket having an open-end slot therein mounted on the other unit, said pin being receivable in said open-end slot for engaging said bracket in driving relation thereby to impart said reciprocating movement to the circuit breaker unit as said actuating member is rotated except when the pin is located in said concentric end portion of said involute slot.

12. In a drawout mechanism for an electric circuit breaker having a movable switch member: an enclosure unit; a removable circuit breaker adapted to contain the circuit breaker and disposed for reciprocating movement to and from a fully inserted position within the enclosure unit; racking means for the circuit breaker unit including an actuating member mounted upon one of said units for pivotal movement between predetermined initial and final positions, a generally involute camming slot in said actuating member having an end portion concentric with respect to the axis of pivotal movement of said actuating member, a pin disposed in said involute slot and mounted on said one unit for pivotal movement about an eccentric axis parallel to the axis of pivotal movement of said actuating member, and a bracket having an open-end slot therein mounted on the other unit, said pin being receivable in said open-end slot for engaging said bracket in driving relation thereby to impart said reciprocating movement to the circuit breaker unit as said actuating member is moved between said initial position and a predetermined position intermediate said initial and final positions, said pin being located in said end portion of said involute slot whenever the actuatng member is between said intermediate and final positions, and an interlock member supported for movement between two different positions in cooperation with said actuating member and the circuit breaker switch member, said interlock member being operable from one to the other of its two positions in response to movement of said actuating member from said intermediate to said final positions and being positively prevented from returning to its one position by the switch member whenever the circuit breaker is closed, said interlock member being disposed when in its other position to prevent movement of the actuating member from said intermediate toward said initial positions, whereby the racking means is ineffective to impart reciprocating movement to the circuit breaker unit as long as the circuit breaker is closed.

References Cited in the file of this patent

UNITED STATES PATENTS

| | | |
|---|---|---|
| 2,768,254 | Pifke | Oct. 23, 1956 |
| 2,776,346 | Stewart et al. | Jan. 1, 1957 |
| 2,921,998 | Pokorny et al. | Jan. 19, 1960 |